(12) United States Patent
Takanashi et al.

(10) Patent No.: US 6,555,614 B2
(45) Date of Patent: Apr. 29, 2003

(54) METHOD FOR PREPARING WATER-BASED URETHANE RESIN COMPOSITION

(75) Inventors: Hirotsugu Takanashi, Awa-gun (JP); Ichirou Muramatsu, Paramus, NJ (US); Masatoshi Motomura, Ichihara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/994,940

(22) Filed: Nov. 28, 2001

(65) Prior Publication Data

US 2002/0111424 A1 Aug. 15, 2002

(30) Foreign Application Priority Data

Nov. 28, 2000 (JP) ......................................... 2000-361060

(51) Int. Cl.$^7$ .............................. C08J 3/00; C08K 3/20; C08L 75/00
(52) U.S. Cl. ....................... 524/589; 524/590; 524/591; 524/839; 524/840
(58) Field of Search ................................ 524/590, 591, 524/839, 840, 589

(56) References Cited

U.S. PATENT DOCUMENTS

| 4,412,022 | A | * | 10/1983 | Hirai et al. |
| 5,227,422 | A | * | 7/1993 | Mitsuji et al. |
| 5,389,130 | A | | 2/1995 | Batlaw et al. |

FOREIGN PATENT DOCUMENTS

| EP | 0 511 457 | 11/1992 |
| GB | 1 575 637 | 9/1980 |

OTHER PUBLICATIONS

Patent Abstract of Japan, vol. 1998, No. 03, Feb. 27, 1998 and JP 09 286845 A (Nov. 4, 1997).

* cited by examiner

Primary Examiner—Patrick D. Niland
(74) Attorney, Agent, or Firm—Armstrong, Westerman & Hattori, LLP

(57) ABSTRACT

A method for preparing a water-based urethane resin composition by reacting a urethane prepolymer (A), which has an isocyanate group at a terminal end and has a carboxyl group in a molecular side chain, a chain extender (B) of the urethane prepolymer (A), and a basic compound (C) in a reaction solvent (D), which comprises:

(1) using, as the urethane prepolymer (A), which has an isocyanate group at a terminal end and has a carboxyl group in a molecular side chain, a urethane prepolymer (a) in which 70 molar % or more of terminal isocyanate groups are attached to carbon of secondary and/or tertiary aliphatic hydrocarbons, the urethane prepolymer being soluble in an alcohol solvent (d), (2) using, as the chain extender (B) of the urethane prepolymer (A), a polyamine (b) having two or more amino groups containing active hydrogen, and (3) using, as the reaction solvent (D), a water-based solvent containing the alcohol solvent (d), has advantages in view of environmental conservation and has good productivity.

According to this method, it is possible to obtain a water-based urethane resin composition, which is superior in physical properties such as water resistance and is suited for use as a binder for water-based printing ink.

13 Claims, No Drawings

METHOD FOR PREPARING WATER-BASED URETHANE RESIN COMPOSITION

BACKGROUND OF THE INVENTION

1. Field of the Invention

The present invention relates to a resin for printing ink, and more particularly, to a method for preparing a water-based urethane resin composition suited for use as a binder in gravure printing ink.

2. Description of Related Art

The demand for a binder and printing ink comprising the binder, which are superior in productivity, has recently increased, not to mention consideration for environmental conservation on a global scale. For example, Japanese Unexamined Patent Application, First Publication Nos. 9-286945, 10-231342 and 10-279650 each discloses a method for preparing a water-based urethane resin composition which is dispersed or dissolved in water, comprising reacting a urethane prepolymer, which has an isocyanate group at a terminal end and has a carboxyl group in a molecular side chain, a chain extender, and a basic compound such as triethylamine or ammonia in a reaction solvent made of an organic solvent having high toxicity such as acetone, toluene or methyl ethyl ketone. However, in these methods, the use of organic solvents, which have high toxicity and are inflammable, such as acetone, toluene and methyl ethyl ketone requires a desolvation step, which takes a long time, and therefore, these methods are not satisfactory with respect to either productivity or consideration of environmental conservation.

BRIEF SUMMARY OF THE INVENTION

An object to be achieved by the present invention is to provide a water-based resin composition which has advantages in view of environmental conservation considerations and has good productivity and excellent physical properties such as water resistance, and is also suited for use as a binder for water-based printing inks.

As a result of diligent research, the present inventors have found that the object described above can be achieved by a method for preparing a water-based urethane resin composition by reacting a urethane prepolymer (A), which has an isocyanate group at a terminal end and has a carboxyl group in a molecular side chain, a chain extender (B) of the urethane prepolymer (A), and a basic compound (C) in a reaction solvent (D), which satisfies the following conditions (1) to (3):

(1) using, as the urethane prepolymer (A), which has an isocyanate group at a terminal end and has a carboxyl group in a molecular side chain, a urethane prepolymer (a) in which 70 molar % or more of terminal isocyanate groups are attached to carbon of secondary and/or tertiary aliphatic hydrocarbons, the urethane prepolymer being soluble in an alcohol solvent (d), (2) using, as the chain extender (B) of the urethane prepolymer (A), a polyamine (b) having two or more amino groups containing active hydrogen, and (3) using, as the reaction solvent (D), a water-based solvent containing the alcohol solvent (d).

According to the method which satisfies the conditions (1) to (3), since the reaction between the isocyanate group attached to carbon of secondary and/or tertiary aliphatic hydrocarbons of the urethane prepolymer (a) and the hydroxyl group of the alcohol solvent (d) proceeds slowly, synthesis of the urethane resin by means of the chain extension reaction between the urethane prepolymer (a) and the polyamine (b) as well as neutralization of the carboxyl group in the urethane prepolymer (a) or urethane resin by means of the basic compound (C) easily proceed and the resulting urethane resin can be easily dispersed or dissolved in a water-based medium comprising the alcohol solvent (d) and water (E), thereby making it possible to prepare a water-based urethane resin composition which is superior in physical properties such as water resistance and is suited for use as a binder for water-based printing ink.

Moreover, since this method does not require the use of organic solvents having high toxicity, such as acetone, toluene and methyl ethyl ketone, a desolvation step, which takes a long time, is not required. Therefore, the method has high productivity and is effective with regard to environmental conservation.

Thus, the present invention provides a method for preparing a water-based urethane resin composition by reacting a urethane prepolymer (A), which has an isocyanate group at a terminal end and has a carboxyl group in a molecular side chain, a chain extender (B) of the urethane prepolymer (A), and a basic compound (C) in a reaction solvent (D), which comprises:

(1) using, as the urethane prepolymer (A), which has an isocyanate group at a terminal end and has a carboxyl group in a molecular side chain, a urethane prepolymer (a) in which 70 molar % or more of terminal isocyanate groups are attached to carbon of secondary and/or tertiary aliphatic hydrocarbons, the urethane prepolymer being soluble in an alcohol solvent (d), (2) using, as the chain extender (B) of the urethane prepolymer (A), a polyamine (b) having two or more amino groups containing active hydrogen, and (3) using, as the reaction solvent (D), a water-based solvent containing the alcohol solvent (d).

The method for preparing a water-based urethane resin composition of the present invention is a method which has advantages in view of environmental conservation consideration because an alcohol solvent is used as an organic solvent, and is also superior in productivity because the method includes no desolvation step. Moreover, according to the method of the present invention, it is made possible to provide a water-based printing ink which is suited for use as water-based printing ink and is superior in balance between performances such as hot water resistance, water resistance and adhesion.

DETAILED DESCRIPTION OF THE INVENTION

The present invention will now be described in detail.

In the present invention, the isocyanate group attached to carbon of the aliphatic hydrocarbon refers to an isocyanate group attached to carbon of a linear aliphatic hydrocarbon and an isocyanate group attached to carbon of a ring structure of a cyclic aliphatic hydrocarbon. For example, an isocyanate group attached directly to an isoprene group attached to a benzene ring, such as bis(1-isocyanate-1-methylethyl)benzene is also an isocyanate group attached to carbon of the aliphatic hydrocarbon. The isocyanate group attached to carbon of a primary, secondary or tertiary aliphatic hydrocarbon refers to an isocyanate group attached to primary, secondary or tertiary carbon of a linear aliphatic hydrocarbon and an isocyanate group attached to primary, secondary or tertiary carbon of a ring structure of a cyclic aliphatic hydrocarbon.

The urethane prepolymer (a) used in the present invention is not specifically limited as long as it is a linear urethane prepolymer which has an isocyanate group attached to carbon of the aliphatic hydrocarbon at a terminal end and has a carboxyl group in a molecular side chain, in which 70 molar % or more of isocyanate groups attached to carbon of the terminal aliphatic hydrocarbon are isocyanate groups attached to carbon of secondary and/or tertiary aliphatic hydrocarbons, the urethane prepolymer being soluble in an alcohol solvent (d) described hereinafter to form a solution. Among these, preferred is a linear urethane prepolymer in which 85 molar % or more of isocyanate groups attached to carbon of the terminal aliphatic hydrocarbon are isocyanate groups attached to carbon of secondary and/or tertiary aliphatic hydrocarbons, and more preferred is a linear urethane prepolymer (a') in which all isocyanate groups attached to carbon of the terminal aliphatic hydrocarbon are isocyanate groups attached to carbon of secondary and/or tertiary aliphatic hydrocarbons.

In the urethane prepolymer, when the proportion of isocyanate groups attached to carbon of secondary and/or tertiary aliphatic hydrocarbons among isocyanate groups attached to carbon of the terminal aliphatic hydrocarbon is less than 70 molar %, the reaction between the hydroxyl group of the alcohol solvent (d) and the isocyanate group of the urethane prepolymer is liable to occur, thereby decreasing the molecular weight of the resulting urethane resin and deteriorating physical properties such as adhesion when used in printing ink. Therefore, it is not preferred.

The urethane prepolymer (a) used in the present invention can be obtained, for example, by using a diol (a1) having a carboxyl group, the other diol (a2) and a diisocyanate (a3) having two isocyanate groups attached to carbon of the aliphatic hydrocarbon and, if necessary, a tri- or polyhydric polyol, and reacting them in accordance with the composition and reaction sequence which enable the resulting urethane prepolymer to have an isocyanate group at a terminal end, 70 molar % or more of terminal isocyanate groups being isocyanate groups attached to carbon of secondary and/or tertiary aliphatic hydrocarbons.

The acid value of the urethane prepolymer (a) is preferably within a range from 10 to 100 mg KOH/g, and particularly from 20 to 80 mg KOH/g, because a urethane resin capable of easily being dispersed or dissolved in a water-based medium comprising an alcohol solvent (d) and water (E) can be obtained. Therefore, a weight ratio of the diol (a1) having a carboxyl group to the other diol (a2), [(a1)/(a2)], is preferably within a range from (1/99) to (30/70), and particularly preferably from (5/95) to (25/75).

The number-average molecular weight of the urethane prepolymer (a) is within a range from 800 to 30,000, and particularly preferably from 1,000 to 20,000, because of excellent solubility in alcohol solvent (d).

In the present invention, the number-average molecular weight refers to a number-average molecular weight indicated by a value as measured by gel permeation chromatograph (GPC) and its numerical value is a value as determined using polystyrene standards.

The method for preparing the linear urethane prepolymer (a') in which all isocyanate groups attached to carbon of the terminal aliphatic hydrocarbon are isocyanate groups attached to carbon of secondary and/or tertiary aliphatic hydrocarbons includes, for example, ① a method of synthesizing a urethane prepolymer having a hydroxyl group at both terminal ends using a diol (a1) having a carboxyl group, the other diol (a2) and a diisocyanate (a3) having two isocyanate groups attached to carbon of an aliphatic hydrocarbon in such a ratio that the equivalent of the total hydroxyl groups of the diols (a1) and (a2) is in excess relative to that of isocyanate groups of the diisocyanate (a3), and reacting the resulting urethane prepolymer with a diisocyanate (a3-1) having two isocyanate groups attached to carbon of secondary and/or tertiary aliphatic hydrocarbons; or ② a method of reacting a diol (a1) having a carboxyl group, the other diol (a2) and a diisocyanate (a3-1) having two isocyanate groups attached to carbon of secondary and/or tertiary aliphatic hydrocarbons in such a ratio that the equivalent of isocyanate groups of the diisocyanate (a3-1) is in excess relative to that of the total hydroxyl groups of the diols (a1) and (a2).

As the diisocyanate (a3) having two isocyanate groups attached to carbon of the aliphatic hydrocarbon used in the method ①, for example, a diisocyanate (a3-2) having two isocyanate groups attached to carbon of a primary aliphatic hydrocarbon is preferably used. The molar ratio of the diisocyanate (a3-l) to the isocyanate (a3-2), [(a3-1)/(a3-2)], is preferably within a range from 2/8 to 5/5. A diisocyanate (a3-3) having primary and secondary aliphatic isocyanate groups can also be used in place of the diisocyanate (a3-2).

Examples of the diol (a1) having a carboxyl group used in the preparation of the urethane prepolymer (a) include dimethylolpropionic acid, dimethylolbutanoic acid, dimethylolpentanoic acid, dimethylolbutyric acid, and dimethylolvaleric acid.

The other diol (a2) is preferably polyether diol or polyester diol.

Examples of the polyether diol include polyethylene glycol, polypropylene glycol, polyoxytetramethylene glycol, and copolymerized polyether diol thereof.

The polyester diol can be obtained, for example, by condensation reaction between a dicarboxylic acid and a diol. Examples of the dicarboxylic acid include aliphatic dicarboxylic acid such as adipic acid, succinic acid, glutaric acid, maleic acid or fumaric acid, or an acid anhydride thereof; and aromatic carboxylic acid such as phthalic acid, isophthalic acid or terephthalic acid, or phthalic anhydride. Examples of the diol include ethylene glycol, propylene glycol, 1,2-butylene glycol, 1,3-butulene glycol, 1,4-butanediol, 2,3-butylene glycol, isobutylene glycol, neopentyl glycol, 2-methyl-2-propyl-1,3-propanediol, 1,5-pentanediol, 1,6-hexanediol, 2-methyl-2,4-pentanediol, 3-methyl-1,5-pentanediol, 2,2,4-trimethyl-1,3-pentanediol, 2-ethyl-1,3-hexanediol, 2,5-methyl-2,5-hexanediol, 1,4-cyclohexane dimethanol, 1,4-butynediol, 1,4-butenediol, and 2,5-dimethyl-3-hexyne-2,5-diol.

Preferred specific examples of the polyester diol include condensate of methylpentanediol and adipic acid, condensate of neopentyl glycol and adipic acid, condensate of 1,4-butanediol and adipic acid, condensate of 1,6-hexanediol and adipic acid, condensate of ethylene glycol and isophthalic acid, and condensate of methylpentanediol and terephthalic acid.

The polyester diol can also be obtained, for example, by heating a lactone compound such as ε-caprolactone, β-caprolactone or δ-caprolactone and a diol compound such as diol monomer, polyester polyol or polyether to a temperature within a range from 150 to 250° C. with stirring. Specific examples thereof include polymer of ε-caprolactone and methylpentanediol, and polymer of β-methyl-δ-valerolactone and 1,6-hexanediol.

The number-average molecular weight of the other diol (a2) is preferably within a range from 300 to 5,000 because the wear resistance of the plate can be reduced during high-speed printing, thereby satisfactorily maintaining the adhesion of ink, when used in water-based printing ink.

Among the diisocyanate (a3) having two isocyanate groups attached to carbon of the aliphatic hydrocarbon, the diisocyanate (a3-1) having two secondary and/or tertiary aliphatic isocyanate groups is preferably diisocyanate having an isocyanate group attached to carbon of an aliphatic hydrocarbon having 9 to 17 carbon atoms. Examples thereof include isopropylidenebis-4-cyclohexyl diisocyanate, dicyclohexylmethane diisocyanate, methylcyclohexane diisocyanate, 1,2-bis(1-isocyanate-1-methylethyl)benzene, 1,3-bis(1-isocyanate-1-methylethyl)benzene, and 1,4-bis(1-isocyanate-1-methylethyl)benzene.

Examples of the diisocyanate (a3-2) having two isocyanate groups attached to carbon of the primary aliphatic hydrocarbon include hexamethylene diisocyanate, methaxylylene diisocyanate, 2,2,4-trimethylhexamethylene diisocyanate, and dimer acid diisocyanate.

Examples of the diisocyanate (a3-3) having an isocyanate group attached to carbon of secondary and primary aliphatic hydrocarbons include isophorone diisocyanate and lysine diisocyanate methyl ester.

Examples of the polyamine (b) having two or more amino groups containing active hydrogen used in the present invention include diamine such as aliphatic diamine, alicyclic diamine or heterocyclic diamine; and triamine such as aliphatic triamine, alicyclic triamine or heterocyclic triamine. Among these polyamines, diamine having a basicity constant (Kb) smaller than that of the basic compound (D) (low basicity) is preferably used. Among these diamines, diamine having one or more hydroxyl groups in a molecule and diamine having a polyether skeleton are preferred, and alkanolamine having 1 to 3 hydroxyl groups in a molecule and etheramine having 1 to 10 ether groups are particularly preferred.

Examples of the alkanolamine include aminoethylethanolamine, aminoethylisopropanolamine, aminoethylpropanolamine, aminoethylbutanolamine, aminoethylisobutanolamine, di-(2-hydroxyethyl)-ethylenediamine, di-(2-hydroxypropyl)-ethylenediamine, and 2,3-di-hydroxypropyleneethylenediamine.

Examples of the etheramine include polyoxyethylenediamine having a molecular weight of 104 to 2,000 including 2-(2-aminoethoxy)ethylamine, 2-[2-(2-aminoethoxy)ethoxy]ethylamine, 2-{2-[2-(2-aminoethoxy)ethoxy]ethoxy}ethylamine; polyoxypropylenediamine having a molecular weight of 132 to 2,000 including 2-(2-aminopropoxy)-1-methylethylamine, 2-[2-(2-aminopropoxy)-1-methylethoxy]-1-methylethylamine, 2-{2-[2-(2-aminopropoxy)-1-methylethoxy]-1-methylethoxy}-1-methylethylamine; copolymer of these polyoxyethylenediamine and polyoxypropylenediamine; and bis-(3-aminopropyl)-ether, 1,2-bis-(3-aminopropoxy)-ethane or 1,3-bis-(3-aminopropoxy)-2,2-dimethylpropane.

These diamines can be used alone or in combination and, if necessary, monoamine such as dinormal butylamine, diisobutylamine or 2-ethylhexylamine can be used in combination.

The polyamine (b) is used in an amount so that the proportion of the amino group in the polyamine (b) is within a range from 0.90 to 0.99 eq., and preferably from 0.93 to 0.97 eq., based on 1 eq. of the terminal isocyanate group of the urethane prepolymer (a).

Examples of the basic compound (C) used in the present invention include ammonia or ammonia water; and tertiary amine such as trimethylamine, triethylamine, N,N-dimethylethanolamine or N,N-diethylethanolamine. Among these basic compounds, ammonia or ammonia water is preferred because water-based printing ink having excellent drying property can be obtained. The basic compound (C) may be those which can be used as the polyamine (b) as long as they can neutralize the carboxyl group of the urethane prepolymer (a). In that case, these compounds can be used alone or in combination with the other polyamine as the polyamine (b) and the basic compound (C).

The amount of the basic compound (C) may be an amount sufficient to hydrophilize the urethane resin having a carboxyl group obtained by the reaction between the urethane prepolymer (a) and the amine (b), thereby making it possible to disperse or dissolve in a water-based medium comprising the alcohol solvent (d) and water (E), and the basic compound is used in an amount sufficient to control the neutralization degree to the carboxyl group to a value within a range from 0.3 to 1.0, and preferably from 0.6 to 1.0.

The water-based solvent containing the alcohol solvent (d) used in the present invention may be a solvent containing the alcohol solvent (d), which can be made aqueous, and examples thereof include alcohol solvent (d) alone, and a mixture of the alcohol solvent (d) and water (E).

Examples of the alcohol solvent (d) include aliphatic alcohol (d1) having 1 to 7 carbon atoms, such as methanol, ethanol, normal propanol, isopropanol, normal butanol, isobutanol, or tertiary butanol; and glycol ether (d2) such as propylene glycol monomethyl ether, propylene glycol propyl ether, propylene glycol isopropyl ether, or propylene glycol monobutyl ether. Among these alcohol solvents, water-soluble alcohol solvents are preferred and those using 100 parts by weight of the aliphatic alcohol (d1) having 1 to 7 carbon atoms in combination with 50 parts by weight of the glycol ether (d2) are more preferred, and an aliphatic alcohol having 1 to 7 carbon atoms is particularly preferred.

The method for preparing the water-based urethane resin composition of the present invention may be a method for preparing a water-based urethane resin composition, which is dispersed or dissolved in a water-based medium comprising an alcohol solvent (d) and water (E), comprising using a urethane prepolymer (a) in which 70 molar % or more of terminal isocyanate groups are attached to carbon of secondary and/or tertiary aliphatic hydrocarbons, the urethane prepolymer being soluble in the alcohol solvent (d), a polyamine (b) having two or more amino groups containing active hydrogen, a basic compound (C) and water (E), and reacting a urethane resin derived from the urethane prepolymer (a), the polyamine (b) and the basic compound (C) in the presence of the alcohol solvent (d) in a water-based solvent containing the alcohol solvent (d). The method includes, for example, a method of mixing a solution, which is prepared by dissolving a urethane prepolymer (a) in an alcohol solvent (d), with a mixture of a polyamine (b), a basic compound (C) and water (E), thereby carrying out the chain extension reaction between the urethane prepolymer (a) and the polyamine (b), neutralization of a carboxyl group of the urethane prepolymer (a) due to the basic compound (C), and dispersion or dissolution of the resulting urethane resin in a water-based medium comprising the alcohol solvent (d) and water (E). Specific examples thereof include:

(1) method of adding a mixture of a polyamine (b), a basic compound (C) and water (E) in a solution, which is prepared by dissolving a urethane prepolymer (a), in an alcohol solvent (d), thereby carrying out the reaction, and dispersing or dissolving the resulting urethane resin in a water-based medium comprising the alcohol solvent (d) and water (E);

(2) method of adding a solution, which is prepared by dissolving a urethane prepolymer (a) in an alcohol solvent (d), in a mixture of a polyamine (b), a basic compound (C) and water (E), thereby carrying out the reaction, and dispersing or dissolving the resulting urethane resin in a water-based medium comprising the alcohol solvent (d) and water (E);

(3) method of dissolving a urethane prepolymer (a) in an alcohol solvent (d), neutralizing a portion or all of carboxyl groups of the urethane prepolymer (a) with a basic compound (C) in the presence of water (E), adding a polyamine (b) with stirring, thereby carrying out the reaction, and dispersing or dissolving the resulting urethane resin in a water-based medium comprising the alcohol solvent (d) and water (E);

(4) method of dissolving a urethane prepolymer (a) in an alcohol solvent (d), neutralizing a portion or all of carboxyl groups of the urethane prepolymer (a) with a basic compound (C), adding a polyamine (b) with stirring in the presence of water (E), thereby carrying out the reaction, and dispersing or dissolving the resulting urethane resin in a water-based medium comprising the alcohol solvent (d) and water (E);

(5) method of dissolving a urethane prepolymer (a) in an alcohol solvent (d), reacting the resulting solution with a polyamine (b) dissolved in the alcohol solvent (d) to yield a carboxyl group-containing urethane resin, adding a basic compound (C), thereby neutralizing a portion or all of carboxyl groups, and dispersing or dissolving the resulting urethane resin in a water-based medium comprising the alcohol solvent (d) and water (E);

(6) method of dissolving a urethane prepolymer (a) in an alcohol solvent (d), reacting the resulting solution with a polyamine (b) dissolved in the alcohol solvent (d) to yield a carboxyl group-containing urethane resin, adding a mixture of a basic compound (C) and water (E), thereby neutralizing a portion or all of carboxyl groups, and dispersing or dissolving the resulting urethane resin in a water-based medium comprising the alcohol solvent (d) and water (E);

(7) method of dissolving a urethane prepolymer (a) in a mixture of a basic compound (C), an alcohol solvent (d) and water (E), thereby neutralizing a portion or all of carboxyl groups of the urethane prepolymer (a) with the basic compound (C), adding a polyamine (b), thereby carrying out the reaction, and dispersing or dissolving the resulting urethane resin in a water-based medium comprising the alcohol solvent (d) and water (E); and (8) method of dissolving a urethane prepolymer (a) in a mixture of a polyamine (b), a basic compound (C), an alcohol solvent (d) and water (E), thereby neutralizing a portion or all of carboxyl groups of the urethane prepolymer (a) with the basic compound (C) and to react with a polyamine (b), and dispersing or dissolving the resulting urethane resin in a water-based medium comprising the alcohol solvent (d) and water (E).

Among these methods, methods (1) to (4) are preferred and methods (1) to (2) are particularly preferred.

In the method of the present invention, the temperature of the reaction between the urethane prepolymer (a) and the polyamine (b) having two or more amino groups containing active hydrogen is usually within a range from 10 to 40° C., and preferably from 20 to 40° C. The reaction time of this reaction is usually 10 minutes or more, and preferably within a range from 30 minutes to 6 hours. The terminal isocyanate group of the resulting urethane resin is blocked by the alcohol solvent (d).

To satisfactorily maintain the adhesion and to prevent the wear resistance of the plate and the density of the print from decreasing, the number-average molecular weight of the urethane resin in the water-based urethane resin composition obtained by the method of the present invention is preferably within a range from 10,000 to 100,000, and particularly preferably from 20,000 to 60,000.

The water-based printing ink using the water-based urethane resin composition of the present invention is obtained, for example, by dispersive mixing of the water-based urethane resin composition of the present invention with colorants and, if necessary, alcohol solvents, water, fillers and additives.

As the colorant used herein, for example, there can be used various colorants such as organic pigments, inorganic pigments and dyes which are used in conventional ink. Among these colorants, organic or inorganic pigments are preferably used in view of the water resistance.

Examples of the organic pigment include Carmine 6B, Lake Red, Permanent Red 2B, Disazo Yellow, Pyrazolone Orange, Carmine FB, Chromophthal Yellow, Chromophthal Red, Phthalocyanine Blue, Phthalocyanine Green, Dioxadine Violet, Quinacridone Magenta, Quinacridone Red, Indanthrone Blue, Pyrimidine Yellow, Thioindigo Bordeaux, Thioindigo Magenta, Perylene Red, Perinone Orange, Isoindolinone Yellow, Aniline Black, Pyrrolopyrrole Red, Diketopyrolopyrole Red, and Daylight Fluorescent Pigment.

Examples of the inorganic pigment include Carbon Black, Aluminum Powder, Bronze Powder, Chrome Vermilion, Yellow Lead, Cadmium Yellow, Cadmium Red, Marine Blue, Prussian Blue, Red Iron Oxide, Yellow Iron Oxide, Iron Black, Titanium Oxide, and Zinc Oxide.

As the alcohol solvent, for example, any alcohol solvent (c) used in the preparation of the water-based urethane resin can be used. Among these alcohol solvents, ethanol, normal propanol and isopropanol are preferred.

The filler includes, for example, those used in conventional ink, and specific examples thereof include carbonates such as calcium carbonate and magnesium carbonate; sulfates such as precipitatable barium sulfate; and silicates such as silica and talc. These fillers can be used alone or in combination.

As the additive, for example, various additives such as waxes, pigment dispersants and defoamers can be used.

With respect to each amount of the various raw material components in the water-based printing ink using the water-based urethane resin composition of the present invention, the amount of the urethane resin (solid content basis) is within a range from 5 to 30%, the amount of the alcohol solvent is within a range from 4 to 60% by weight, the amount of water is within a range from 10 to 70 by weight, the amount of the oolorant is within a range from 0 to 55% by weight, the amount of filler is within a range from 0 to 20% by weight, and the amount of the additive is within a range from 0 to 10 by weight, preferably. Particularly preferably, the amount of the urethane resin (solid content basis) is within a range from 5 to 20%, the amount of the alcohol solvent is within a range from 10 to 50% by weight, the amount of the colorant is within a range from 5 to 50% by weight, the amount of the filler is within a range from 1 to 10% by weight, and the amount of additive is within a range from 0.5 to 3% by weight.

Examples of the substrate for printing with the water-based printing ink include absorbing substrates such as paper; and non-absorbing substrates such as polyethylene, polypropylene, nylon, polyethylene terephthalate (PET), polypropylene (PP) and plastic.

EXAMPLES

The following Examples and Comparative Examples further illustrate the present invention in detail. In the following Examples and Comparative Examples, parts and percentages are by weight unless otherwise specified.

Example 1

In a 1 liter four-necked flask equipped with a stirrer, a thermometer, a Dimroth reflux condenser and a nitrogen introducing tube, 200 parts of polypropylene glycol having a molecular weight of 2,000, 100 parts of polyoxytetramethylene glycol having a molecular weight of 1,000 and 30 parts of dimethylolbutanoic acid (hereinafter referred to as DMBA) were charged and, after passing nitrogen gas through the flask, the mixture was heated to 90° C. with stirring. Subsequently, 122 parts of 1,3-bis(1-isocyanate-1-methylethyl)benzene was added and the reaction was carried out at 115° C. until the isocyanate group content (NCO %) reached 1.9% and, furthermore, 90 parts of isopropyl alcohol was added and the reaction solution was cooled to 75° C. to obtain a solution of a linear urethane prepolymer, which has an isocyanate group attached to carbon of an aliphatic hydrocarbon at both terminal ends and has an acid value of 25.1 mg KOH/g.

In a 2 liter four-necked flask equipped with a stirrer, a thermometer, a Dimroth reflux condenser and a nitrogen introducing tube, a mixture of 842 parts of water, 11 parts of 25% ammonia water and 9.4 parts of aminoethylethanolamine was charged and, after passing nitrogen gas through the flask, the mixture was stirred at 25° C. Subsequently, 488 parts of the linear urethane prepolymer solution was added and the reaction was carried out with stirring at 35° C. for 3 hours to obtain a water-based urethane resin dispersion (X-1) in which a urethane resin is dispersed in a water-based medium containing isopropyl alcohol.

Example 2

In a 1 liter four-necked flask equipped with a stirrer, a thermometer, a Dimroth reflux condenser and a nitrogen introducing tube, 200 parts of a condensate of neopentyl glycol having a molecular weight of 2,000 and adipic acid, 100 parts of a condensate of methylpentanediol having a molecular weight of 1,000 and adipic acid and 30 parts DMBA were charged and, after passing nitrogen gas through the flask, the mixture was heated to 90° C. with stirring. Subsequently, 131 parts of dicyclohexylmethane diisocyanate was added and the reaction was carried out at 115° C. until the isocyanate group content (NCO %) reached 1.8% and, furthermore, 92 parts of isopropyl alcohol was added and the reaction solution was cooled to 75° C. to obtain a solution of a linear urethane prepolymer, which has an isocyanate group attached to carbon of a tertiary aliphatic hydrocarbon at both terminal ends and has an acid value of 24.6 mg KOH/g.

In a 2 liter four-necked flask equipped with a stirrer, a thermometer, a Dimroth reflux condenser and a nitrogen introducing tube, a mixture of 856 parts of water, 11 parts of 25% ammonia water and 12.6 parts of triethyleneglycoldiamine was charged and, after passing nitrogen gas through the flask, the mixture was stirred at 25° C. Subsequently, 497 parts of the linear urethane prepolymer solution was added and the reaction was carried out with stirring at 35° C. for 3 hours to obtain a water-based urethane resin dispersion (X-2) in which a urethane resin is dispersed in a water-based medium containing isopropyl alcohol.

Example 3

In a 2 liter four-necked flask equipped with a stirrer, a thermometer, a Dimroth reflux condenser and a nitrogen introducing tube, 200 parts of polypropylene glycol having a molecular weight of 2,000, 100 parts of polypropylene glycol having a molecular weight of 1,000 and 30 parts of DMBA were charged and, after passing nitrogen gas through the flask, the mixture was heated to 90° C. with stirring. Subsequently, 58 parts of isopropylidenebis-4-cyclohexyl isocyanate was added and the reaction was carried out at 115° C. until the content of the residual isocyanate group reached 0 molar % to obtain a prepolymer having a hydroxyl group at both terminal ends. Subsequently, 73 parts of 1,3-bis(1-isocyanate-1-methylethyl)benzene was added and the reaction was carried out at 115° C. until the isocyanate group content (NCO %) reached 1.8% and, furthermore, 92 parts of isopropyl alcohol was added and the reaction solution was cooled to 75° C. to obtain a solution of a linear urethane prepolymer, which has an isocyanate group attached to carbon of a tertiary aliphatic hydrocarbon at both terminal ends and has an acid value of 24.6 mg KOH/g. Then, a mixture of 1049 parts of water, 12 parts of 25% ammonia water and 10.6 parts of aminoethylethanolamine was charged and the reaction was carried out with stirring at 35° C. for 3 hours to obtain a water-based urethane resin dispersion (X-3) in which a urethane resin is dispersed in a water-based medium containing isopropyl alcohol.

Example 4

In a 2 liter four-necked flask equipped with a stirrer, a thermometer, a Dimroth reflux condenser and a nitrogen introducing tube, 300 parts of a condensate of methylpentanediol having a molecular weight of 1,000 and adipic acid and 59 parts of DMBA were charged and, after passing nitrogen gas through the flask, the mixture was heated to 90° C. with stirring. Subsequently, 134 parts of isophorone diisocyanate was added and the reaction was carried out at 100° C. until the isocyanate group content (NCO %) reached 0% to obtain a prepolymer having a hydroxyl group at both terminal ends. Subsequently, 49 parts of 1,3-bis(1-isocyanate-1-methylethyl)benzene was added and the reaction was carried out at 115° C. until the isocyanate group content (NCO %) reached 1.55% and, furthermore, 163 parts of isopropyl alcohol was added and the reaction solution was cooled to 75° C. to obtain a solution of a linear urethane prepolymer, which has an isocyanate group attached to carbon of a tertiary aliphatic hydrocarbon at both terminal ends and has an acid value of 41.2 mg KOH/g. Then, a mixture of 1041 parts of water, 25 parts of 25% ammonia water and 9.9 parts of aminoethylethanolamine was charged and the reaction was carried out with stirring at 35° C. for 3 hours to obtain a water-based urethane resin dispersion (X-4) in which a urethane resin is dispersed in a water-based medium containing isopropyl alcohol.

Example 5

In the same manner as in Example 1, a solution of a linear urethane prepolymer, which has an isocyanate group attached to carbon of a tertiary aliphatic hydrocarbon at both terminal ends and also has a carboxyl group, was obtained.

In a 2 liter four-necked flask equipped with a stirrer, a thermometer, a Dimroth reflux condenser and a nitrogen introducing tube, a mixture of 812 parts of water and 12 parts of 25% ammonia water was charged and, after passing nitrogen gas through the flask, the mixture was stirred at 25° C. Subsequently, 488 parts of the linear urethane prepolymer solution was added and the mixture was stirred at 35° C. for 15 minutes to obtain a water dispersion of the linear urethane prepolymer. Furthermore, 9 parts of aminoethylethanolamine was added and the reaction was carried out with stirring at 35° C. for 3 hours to obtain a water-based urethane resin dispersion (X-5) in which a urethane resin is dispersed in a water-based medium containing isopropyl alcohol.

Example 6

In the same manner as in Example 3, a solution of a linear urethane prepolymer, which has an isocyanate group attached to carbon of a tertiary aliphatic hydrocarbon at both terminal ends and also has a carboxyl group, was obtained.

In a 2 liter four-necked flask equipped with a stirrer, a thermometer, a Dimroth reflux condenser and a nitrogen introducing tube, a mixture of 864 parts of water and 12 parts of 25% ammonia water was charged and, after passing nitrogen gas through the flask, the mixture was stirred at 25° C. Subsequently, 497 parts of the linear urethane prepolymer solution was added and the mixture was stirred at 35° C. for 15 minutes to obtain a water dispersion of the linear urethane prepolymer. Furthermore, 9 parts of aminoethylethanolamine was added and the reaction was carried out with stirring at 35° C. for 3 hours to obtain a water-based urethane resin dispersion (X-6) in which a urethane resin is dispersed in a water-based medium containing isopropyl alcohol.

Comparative Example 1

In a 1 liter four-necked flask equipped with a stirrer, a thermometer, a Dimroth reflux condenser and a nitrogen introducing tube, 200 parts of polypropylene glycol having a molecular weight of 2,000, 100 parts of polypropylene glycol having a molecular weight of 1,000 and 30 parts of DMBA were charged and, after passing nitrogen gas through the flask, the mixture was heated to 80° C. with stirring. Subsequently, 112 parts of isophorone diisocyanate was added and the reaction was carried out at 100° C. until the isocyanate group content (NCO %) reached 1.9% to obtain a linear urethane prepolymer which has an isocyanate group attached to carbon of primary and secondary hydrocarbons at both terminal ends and also has a carboxyl group. Then, 747 parts of methyl ethyl ketone and 320 parts of isopropyl alcohol were added to obtain a solution of a linear urethane prepolymer having an acid value of 25.7 mg KOH/g. Furthermore, 16 parts of isophoronediamine was added and the reaction was carried out at 40° C. for 3 hours to obtain a solvent-soluble urethane resin solution. After 13 parts of 25% ammonia water was added and 1,108 parts of water was added, thereby dispersing the urethane resin solution in water, methyl ethyl ketone and isopropyl alcohol were distilled off by heating under reduced pressure to obtain a water-based urethane resin dispersion (RX-1).

Comparative Example 2

In a 1 liter four-necked flask equipped with a stirrer, a thermometer, a Dimroth reflux condenser and a nitrogen introducing tube, 300 parts of polypropylene glycol having a molecular weight of 1,500 and 30 parts of DMBA were charged and, after passing nitrogen gas through the flask, the mixture was heated to 80° C. with stirring. Subsequently, 84 parts of hexamethylene diisocyanate was added and the reaction was carried out at 100° C. until the isocyanate group content (NCO %) reached 2.0% to obtain a linear urethane prepolymer which has an isocyanate group attached to carbon of a primary hydrocarbon at both terminal ends and also has a carboxyl group. Then, 105 parts of acetone was added to obtain a solution of a linear urethane prepolymer having an acid value of 27.4 mg KOH/g.

In a 2 liter four-necked flask equipped with a stirrer, a thermometer, a Dimroth reflux condenser and a nitrogen introducing tube, 851 parts of water and 18 parts of triethylamine were charged and, after passing nitrogen gas through the flask, the mixture was stirred at 25° C. Subsequently, 373 parts of the linear urethane prepolymer solution was added and the mixture was stirred at 35° C. for 15 minutes to obtain a water dispersion of the linear urethane prepolymer. Furthermore, 2.7 parts of hydrazine was added and the reaction was carried out at 40° C. for 3 hours, and then acetone was distilled off by heating under reduced pressure to obtain a water-based urethane resin dispersion (RX-2).

Characteristic values of the resins obtained in the Examples and Comparative Examples are shown in Tables 1 (1) and 1 (2).

TABLE 1 (1)

| | Examples | | | |
|---|---|---|---|---|
| Items | 1 | 2 | 3 | 4 |
| Name of sample | X-1 | X-2 | X-3 | X-4 |
| Appearance | Translucent | Translucent | Translucent | Transparent |
| Viscosity (Pa · s) | 1600 | 1000 | 1400 | 1300 |
| Number-average molecular weight | 35000 | 25000 | 34000 | 26000 |
| Nonvolatile content (%) | 31 | 31 | 31 | 31 |

TABLE 1 (2)

| | Examples | | Comparative Examples | |
|---|---|---|---|---|
| Items | 5 | 6 | 1 | 2 |
| Name of sample | X-5 | X-6 | RX-1 | RX-2 |
| Appearance | Translucent | Translucent | Translucent | Translucent |
| Viscosity (Pa · s) | 1500 | 1300 | 1400 | 1000 |
| Number average molecular weight | 33000 | 31000 | 33000 | 3000 |
| Nonvolatile content (%) | 31 | 31 | 31 | 31 |

Notes of Tables 1 (1) and 1 (2)
Viscosity: The viscosity of a resin solution was measured at 25° C. by a B type viscometer.
Molecular weight: The number-average molecular weight was measured by GPC (THF solvent, 40° C.) using molecular weight distribution polystyrene standards.
Nonvolatile content: 1 g of a water-based urethane resin dispersion or solution was diluted with 5 g of isopropyl alcohol and was dried at 107° C. for 2 hours, and then the nonvolatile content was calculated.

Application Examples 1 to 6 and Comparative Application Examples 1 to 2

According to the composition ① shown in Tables 2 (1) and 2 (2), the respective components were dispersed for one hour using a pigment dispersing machine (Paint Shaker) and the viscosity of the resulting dispersion was controlled so that the measurement using a #3 Zahn cup was 18 seconds, using each mixed solvent prepared according to the composition ② shown in Tables 2 (1) and 2 (2) to prepare each water-based printing ink. Using a baby printing press manufactured by Higashitani Ironworks Co., Ltd., a polypropylene film was printed with the resulting water-based printing ink and, after drying at 80° C. for 15 seconds, the following evaluation tests were carried out. The results are shown in Tables 3 (1) and 3 (2).

<Evaluation procedures>

(1) Odor: This was judged by the presence or absence of ketone or amine odor. Samples free from ketone or amine odor were rated "Good" (○), samples with slight ketone or amine odor were rated "Ordinary" (Δ), and samples with ketone or amine odor were rated "Poor" (X).

(2) Hot water resistance: The printed surface of the polypropylene film was coated with a two-part curable isocyanate adhesive and the polyethylene film was laminated on the polypropylene film using a laminator. The print laminated with this film was immersed in hot water at 95° C. for one hour and the hot water resistance was evaluated. Samples where no change in appearance was observed in the print laminated with the film were rated "Good" (○), samples where a portion of the print laminated with the film was peeled off were rated "Ordinary" (Δ), and samples where the print laminated with the film was completely peeled off were rated "Poor" (X).

(3) Water resistance: The printed polypropylene film was immersed in water at 25° C. for 24 hours and the water resistance was evaluated. Samples where no change in appearance was observed in the printed PP film were rated "Good" (○), samples where blistering occurred on a portion of the printed PP film were rated "Ordinary" (Δ), and samples where blistering occurred over the entire printed PP film were rated "Poor" (X).

(4) Adhesion: Cellophane tape was applied onto the printed surface and, after removing the Cellophane tape, the adhesion was evaluated. Samples where no peeling occurred were rated "Good" (○), samples where partial peeling occurred were rated "Ordinary" (Δ), and samples where peeling occurred with the width, which is the same as or larger than that of the Cellophane tape, were rated "Poor" (X).

TABLE 2 (1)

| Items | | | Application Examples | | | |
|---|---|---|---|---|---|---|
| | | | 1 | 2 | 3 | 4 |
| Composition ① | X-1 | | 25 | | | |
| | X-2 | | | 25 | | |
| | X-3 | | | | 25 | |
| | X-4 | | | | | 25 |
| | Titanium white | | 50 | 50 | 50 | 50 |
| | Ethanol | | 10 | 10 | 10 | 10 |
| | Isopropyl alcohol | | 3 | 3 | 3 | 3 |
| | Water | | 12 | 12 | 12 | 12 |
| Composition ② | Isopropyl alcohol | | 10 | 10 | 10 | 10 |
| | Ethanol | | 40 | 40 | 40 | 40 |
| | Water | | 50 | 50 | 50 | 50 |

TABLE 2 (2)

| Items | | | Application Examples | | Comparative Application Examples | |
|---|---|---|---|---|---|---|
| | | | 5 | 6 | 1 | 2 |
| Composition ① | X-5 | | 25 | | | |
| | X-6 | | | 25 | | |
| | RX-1 | | | | 25 | |
| | RX-2 | | | | | 25 |
| | Titanium white | | 50 | 50 | 50 | 50 |
| | Ethanol | | 10 | 10 | 10 | 10 |
| | Isopropyl alcohol | | 3 | 3 | 3 | 3 |
| | Water | | 12 | 12 | 12 | 12 |
| Composition ② | Isopropyl alcohol | | 10 | 10 | 10 | 10 |
| | Ethanol | | 40 | 40 | 40 | 40 |
| | Water | | 50 | 50 | 50 | 50 |

TABLE 3 (1)

| Items | Application Examples | | | |
|---|---|---|---|---|
| | 1 | 2 | 3 | 4 |
| Odor | ○ | ○ | ○ | ○ |
| Hot water resistance | ○ | ○ | ○ | ○ |
| Water resistance | ○ | ○ | ○ | ○ |
| Adhesion | ○ | ○ | ○ | ○ |

TABLE 3 (2)

| Items | Application Examples | | Comparative Application Examples | |
|---|---|---|---|---|
| | 5 | 6 | 1 | 2 |
| Odor | ○ | ○ | Δ | X |
| Hot water resistance | ○ | ○ | ○ | X |
| Water resistance | ○ | ○ | ○ | Δ |
| adhesion | ○ | ○ | ○ | ○ |

What is claimed is:

1. A method for preparing a water-based urethane resin composition by reacting a urethane prepolymer (A), which has an isocyanate group at a terminal end and has a carboxyl group in a molecular side chain, a chain extender (B) of the urethane prepolymer (A), and a basic compound (C) in a reaction solvent (D), which comprises:

(1) using, as the urethane prepolymer (A), which has an isocyanate group at a terminal end and has a carboxyl group in a molecular side chain, a urethane prepolymer (a), in which 70 molar % or more of terminal isocyanate groups are attached to carbon of secondary and/or tertiary aliphatic hydrocarbons, the urethane prepolymer being soluble in an alcohol solvent (d), (2) using, as the chain extender (B) of the urethane prepolymer (A), a polyamine (b) having two or more amino groups containing active hydrogen, and (3) using, as the reaction solvent (D), a water-based solvent containing the alcohol solvent (d) and water.

2. A method for preparing a water-based urethane resin composition according to claim 1, wherein the polyamine (b) having two or more amino groups containing active hydrogen is diamine having a basicity constant (Kb) smaller than that of the basic compound (D).

3. A method for preparing a water-based urethane resin composition according to claim 1, wherein the urethane prepolymer (a) is a linear urethane prepolymer (a') in which all terminal isocyanate groups are isocyanate groups attached to carbon of secondary and/or tertiary aliphatic hydrocarbons.

4. A method for preparing a water-based urethane resin composition according to claim 3, wherein the alcohol solvent (d) is an aliphatic alcohol having 1 to 7 carbon atoms.

5. A method for preparing a water-based urethane resin composition according to claim 4, wherein the polyamine (b) having two or more amino groups containing active hydrogen is diamine having a diamine skeleton and/or a polyether skeleton and the alcohol solvent (d) is an aliphatic alcohol having 1 to 7 carbon atoms.

6. A method for preparing a water-based urethane resin composition according to claim 3, wherein the urethane prepolymer (a) is a linear urethane prepolymer having an acid value within a range from 20 to 80 mg KOH/g.

7. A method for preparing a water-based urethane resin composition according to claim 4, wherein the urethane prepolymer (a) is a linear urethane prepolymer having an acid value within a range from 20 to 80 mg KOH/g.

8. A water-based printing ink comprising a colorant and the water-based urethane resin composition prepared by the method of claim 1.

9. A water-based printing ink according to claim 8, wherein said colorant is selected from the group consisting of organic pigments, inorganic pigments and dyes.

10. A water-based printing ink according to claim 9, wherein the amount of the urethane resin, on a solid content basis, is within the range of from 5 to 30%, the amount of alcohol solvent is within the range from 4 to 60% by weight, and the amount of water is within the range from 10 to 70% by weight.

11. A water-based printing ink according to claim 10, wherein the amount of the urethane resin, on a solid content basis, is within the range of from 5 to 20%, the amount of alcohol solvent is within the range from 10 to 50% by weight, and the amount of colorant is within the range from 5 to 50% by weight.

12. A water-based printing ink according to claim 8, wherein said printing ink is applied to a water-based ink absorbing substrate.

13. A water-based printing ink according to claim 12, wherein said water-based ink absorbing substrate is paper.

* * * * *